United States Patent Office 2,738,352
Patented Mar. 13, 1956

2,738,352

PURIFICATION OF PYRIDINE COMPOUNDS

Abraham Bavley, Brooklyn, Edgar Kingdon Hamilton, Merrick, and William J. Kraus, Brooklyn, N. Y., assignors to Chas. Pfizer & Co., Inc., New York, N. Y., a corporation of Delaware No Drawing. Application April 6, 1953,
Serial No. 347,156

5 Claims. (Cl. 260—295)

This invention is concerned with a method for the purification of citrazinic acid and with the highly purified products obtained by this method.

Citrazinic acid is generally known as a yellow to green solid which is difficult to purify. It had been believed that the compound has an inherent yellow color. However, it has now been found that by procedures, which will be described in detail below, the compound may be obtained as a white product. Although certain methods have been developed which are useful in preparing small quantities of purified citrazinic acid, these are not useful for the large-scale preparation of the material. One such method consists of suspending crude (90–95%) citrazinic acid in methanol and bubbling in gaseous hydrogen chloride until the solid dissolves. On cooling the solution, the product which precipitates may be filtered and suspended in hot water to obtain fairly light-colored citrazinic acid. A second method that has been used involves the preparation of the acetate of citrazinic acid by treatment of the compound with acetic anhydride containing a trace of an acid catalyst. The acetate is crystallized and then hydrolyzed by means of dilute mineral acid to citrazinic acid. These two methods give poor yields and the products are not of the highest quality.

It has now been found that crude citrazinic acid, even material which is very deeply colored, may be purified by stirring the material in strong sulfuric acid. If an elevated temperature is used, the crude material dissolves but in a short time a crystalline product separates. At lower temperatures dissolution may be incomplete but, nevertheless, purification is achieved. Apparently, in this case, only part of the material dissolves at any given time and material continually dissolves and crystallizes. The crystals that are formed are relatively large and of well defined structure, appearing to be citrazinic acid sulfate. This sulfate is not stable in dilute sulfuric acid or water, but reverts to citrazinic acid itself, the desired product. The sulfate precipitate may be washed with strong sulfuric acid after filtration. When the crystals are suspended in water, highly purified citrazinic acid, white in color, is obtained. This material is 98% or higher in purity and yields in the order of 80–85% are regularly obtained. Analysis of the material may be made by means of absorption in the ultraviolet region of the spectrum or by titration.

In operating the process of this invention it is most important that a concentration of at least approximately 65% by weight of sulfuric acid be used. If 60% acid is used under otherwise the same conditions, the citrazinic acid is not purified even at an elevated temperature. On the other hand, if 90% sulfuric acid is used, a low yield of the purified product is obtained. It has been found that acid with a concentration of from about 65% to about 80% is suitable for the operation of this process. A concentration of about 70% is most useful. Furthermore, the peculiar purification technique seems to be specific to sulfuric acid. If concentrated aqueous hydrochloric acid (about 37% by weight) is used, the purification of the product is not obtained. The substitution of 75% by weight of ortho-phosphoric acid also does not yield a satisfactory product. The use of strong nitric acid is not possible since this material brings about the nitration and further reactions of the citrazinic acid.

Temperatures of from about 20° C. to about 140° C. may be used for the present process. For best results, it is preferred to operate the present process at a temperature over about 100° C. If lower temperatures are used, the same degree of purification may take a longer time. Temperatures in the range of from about 105° C. to about 130° C. are particularly satisfactory. Under such conditions, up to about 50 grams of crude citrazinic acid will readily dissolve in 100 cc. of 65–80% sulfuric acid.

In manufacturing citrazinic acid from citric acid or citric esters and ammonium hydroxide the crude product that is obtained may contain appreciable amounts of citrazinamide. This material is an undesirable contaminant and it has been found that in the operation of the present purification process particularly at elevated temperatures the amide present as a contaminant is completely converted to citrazinic acid. This is an additional unexpected advantage of the purification procedure that is described and claimed herein.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

Example I

Crude citrazinic acid prepared by the reaction of citric acid and ammonia was analyzed and found to contain about 78% by weight of citrazinic acid and 8.2% moisture. This material was brown in color. 250 grams of the crude product was added with stirring to 570 milliliters of 70% by weight sulfuric acid. The mixture was heated to 105° C. to 110° C. and maintained at this temperature for one and one-half hours. The mixture was cooled to room temperature with agitation. The crystals which separated were filtered on a glass funnel and were then washed with 200 milliliters of 70% sulfuric acid. The filtrate was very dark in color. The crystalline material, apparently a sulfate of citrazinic acid, was gradually added to 2 liters of water at 60° C. During the addition, the mixture was stirred. White purified citrazinic acid separated and was filtered. The product was washed with 500 milliliters of water and it was then dried under vacuum at 50° C. overnight. The product was a white powder weighing 156 grams and it proved to be over 99% pure citrazinic acid.

Example II

A sample of citrazinic acid assaying approximately 98% but dark brown in color was treated just exactly as in Example I. From this procedure 206 grams of a white product were obtained. This material proved to be 100% pure citrazinic acid.

What is claimed is:

1. A process for the purification of citrazinic acid which comprises contacting crude citrazinic acid with strong sulfuric acid, having a concentration of from about 65 to about 80% by weight, at an elevated temperature, removing the crystalline solid that forms upon cooling the mixture and contacting said crystalline solid with water to form purified citrazinic acid.

2. A process as claimed in claim 1 wherein the temperature is maintained at between about 105° C. and about 130° C.

3. A process for the purification of citrazinic acid which comprises contacting crude citrazinic acid with sulfuric acid having a concentration of about 70% by weight at a temperature of from about 105° C. to about 110° C., filtering the crystalline solid that forms upon cooling the mixture and contacting said crystalline solid with water to form purified citrazinic acid.

4. A process for the purification of citrazinic acid containing citrazinamide in appreciable amounts as an impurity which comprises contacting citrazinic acid containing citrazinamide with strong sulphuric acid having a concentration of from about 65% to about 80% by weight, at an elevated temperature, recovering the crystalline solid that forms upon cooling the mixture, and contacting said crystalline solid with water to form purified citrazinic acid.

5. The process which comprises contacting a mixture of citrazinic acid and citrazinamide with strong sulfuric acid having a concentration of from about 65% to about 80% by weight, at an elevated temperature, recovering the crystalline solid that forms upon cooling the mixture, and contacting said crystalline solid with water to form citrazinic acid.

References Cited in the file of this patent

FOREIGN PATENTS 619,241   Great Britain _____ Mar. 7, 1949

OTHER REFERENCES

Sell et al.: J. Chem. Soc., vol. 65, pp. 828–34.
Behrmann et al.: Berichte, vol. 17, pp. 2687–89 (1884).